(12) United States Patent
Kimura et al.

(10) Patent No.: US 11,151,430 B2
(45) Date of Patent: Oct. 19, 2021

(54) IMAGE FORMING APPARATUS CAPABLE OF EXECUTING LINE WIDTH ADJUSTMENT PROCESS, METHOD OF CONTROLLING SAME, AND STORAGE MEDIUM

(71) Applicant: CANON KABUSHIKI KAISHA, Tokyo (JP)

(72) Inventors: Hiromi Kimura, Kawasaki (JP); Shuichi Takenaka, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/806,249

(22) Filed: Mar. 2, 2020

(65) Prior Publication Data
US 2020/0293843 A1 Sep. 17, 2020

(30) Foreign Application Priority Data
Mar. 11, 2019 (JP) .............................. JP2019-043872

(51) Int. Cl.
G06K 15/02 (2006.01)
G06T 3/00 (2006.01)
H04N 1/00 (2006.01)

(52) U.S. Cl.
CPC ..... *G06K 15/1843* (2013.01); *G06K 15/1809* (2013.01); *G06K 15/1878* (2013.01); *G06T 3/00* (2013.01); *H04N 1/00596* (2013.01)

(58) Field of Classification Search
None
See application file for complete search history.

(56) References Cited

U.S. PATENT DOCUMENTS

| 8,331,683 | B2 | 12/2012 | Oishi | |
|---|---|---|---|---|
| 8,995,791 | B2* | 3/2015 | Otsuka | ...................... G06T 3/40 382/296 |
| 2006/0285167 | A1* | 12/2006 | Washio | ................ H04N 1/4092 358/3.14 |
| 2007/0002080 | A1* | 1/2007 | Ishizaka | ................. G06K 15/02 345/660 |
| 2009/0214119 | A1* | 8/2009 | Oishi | ................... H04N 1/3873 382/190 |
| 2016/0381249 | A1* | 12/2016 | Eguchi | ..................... H04N 1/58 358/2.1 |
| 2017/0134612 | A1* | 5/2017 | Mita | .................... H04N 1/6008 |

FOREIGN PATENT DOCUMENTS

JP 2009200837 A 9/2009

* cited by examiner

*Primary Examiner* — Haris Sabah
(74) *Attorney, Agent, or Firm* — Rossi, Kimms & McDowell LLP

(57) ABSTRACT

An image forming apparatus that prevents, when reducing variation in thickness of thin lines, the legibility of the thin lines from being adversely affected thereby. When print data is acquired, in a rendering process for printing based on the acquired print data, the rendering process including a line width adjustment process is executed. In a case where the line width adjustment process is executed on the print data, not only the line width adjustment process but also a process for thickening thin lines is executed.

7 Claims, 9 Drawing Sheets

FIG. 2(A) LINE WIDTH ADJUSTMENT OFF
FIG. 2(B) LINE WIDTH ADJUSTMENT ON
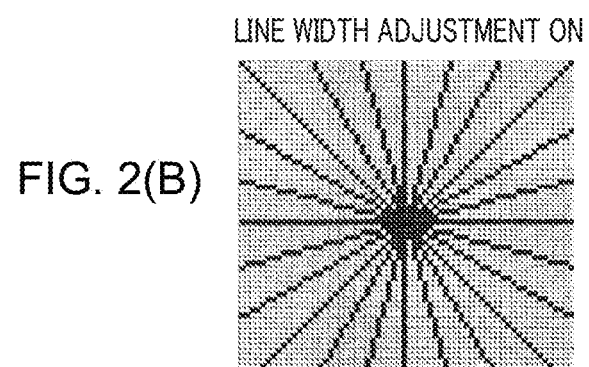
FIG. 2(C) LINE WIDTH ADJUSTMENT ON & LINE THICKENING
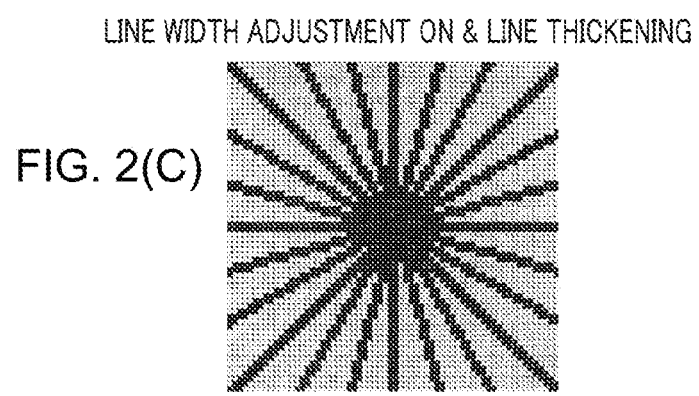

*FIG. 3*
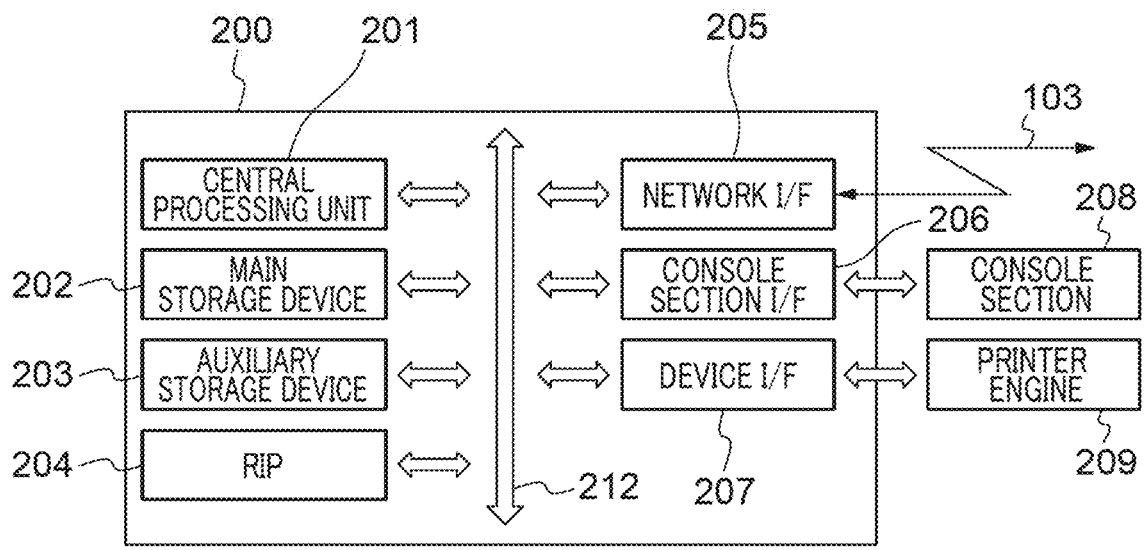
*FIG. 4*
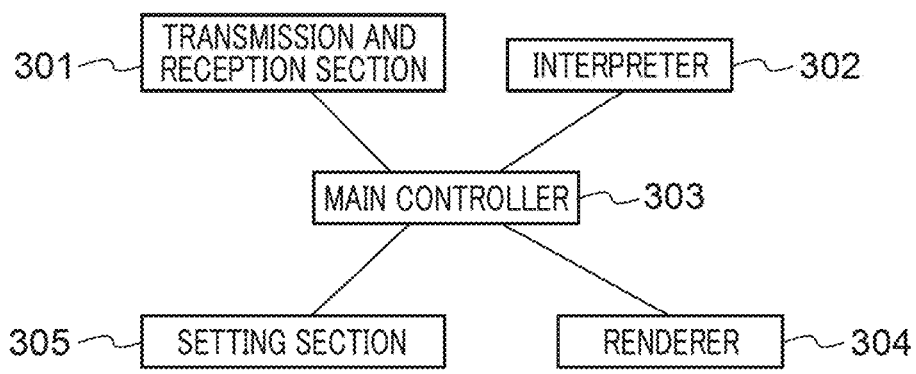
*FIG. 5*
| PDL COMMAND DESIGNATION | AUTOMATIC STROKE ADJUSTMENT ATTRIBUTE | INTERNAL PARAMETER OF THIN LINE-THICKENING PROCESS |
|---|---|---|
| NO DESIGNATION | FALSE | NOT EXECUTE |
| TRUE | TRUE | EXECUTE |
| FALSE | FALSE | NOT EXECUTE |

FIG. 10

```
THIN LINE ADJUSTMENT-
SETTING PROCESS
        │
        ▼
DISPLAY THIN LINE            ─── S4001
ADJUSTMENT-SETTING SCREEN
        │
        ▼
   SETTING CHANGED? ─── NO ──┐
        │ S4002              │
        YES                  │
        ▼                    │
UPDATE SETTING OF  ─── S4003 │
THIN LINE ADJUSTMENT         │
        │◄───────────────────┘
        ▼
       END
```

| PDL COMMAND DESIGNATION | LUI SETTING | AUTOMATIC STROKE ADJUSTMENT ATTRIBUTE | INTERNAL PARAMETER OF THIN LINE-THICKENING PROCESS |
|---|---|---|---|
| NO DESIGNATION | OFF | FALSE | NOT EXECUTE |
| | MODE 1 | TRUE | NOT EXECUTE |
| | MODE 2 | TRUE | EXECUTE |
| TRUE | OFF | TRUE | EXECUTE |
| | MODE 1 | TRUE | NOT EXECUTE |
| | MODE 2 | TRUE | EXECUTE |
| FALSE | OFF | FALSE | NOT EXECUTE |
| | MODE 1 | FALSE | NOT EXECUTE |
| | MODE 2 | FALSE | NOT EXECUTE |

IMAGE FORMING APPARATUS CAPABLE OF EXECUTING LINE WIDTH ADJUSTMENT PROCESS, METHOD OF CONTROLLING SAME, AND STORAGE MEDIUM

BACKGROUND OF THE INVENTION

Field of the Invention

The present invention relates to an image forming apparatus capable of executing a line width adjustment process.

Description of the Related Art

An image forming apparatus executes, upon receipt of print data, a rendering process for plotting a drawing object included in the print data, on device coordinates, according to the print settings of double-sided print, an aggregated layout (Nup), an output sheet size, a resolution, and so forth. Then, the image forming apparatus prints an image generated by the rendering process on a sheet or the like.

Incidentally, examples of print data used for printing include print data in a PostScript format, and print data in a PDF format. Further, print data in these data formats can be set to be subjected to a line width adjustment process (automatic stroke adjustment process). In a case where the print data s is set to be subjected to the line width adjustment process as mentioned above, the image forming apparatus executes the line width adjustment process e.g. in the rendering process. As the line width adjustment process, the image forming apparatus executes processing for uniforming thin lines, on pixels determined to be filled in, by the rendering process based on the print data. With this processing, image quality of an image to be printed on a sheet or the like can be improved according to the intention of a user. For example, in the fill-in pixel determination in the rendering process, when a thin line object having a width of one pixel is disposed such that it has an inclination with respect to the device coordinates, a plurality of pixels are determined to be filled in, in a portion for the pixel determination across a pixel boundary. As a result, the line width is different between this portion for determination and portions above and under the portion for determination, in other words, the line width of the thin line object becomes ununiform. To solve this problem, for example, Japanese Laid-Open Patent Publication (Kokai) No. 2009-200837 discloses, as an example of the line width adjustment process, a method of executing processing for displacing only one of end points of a portion having an inclination of 45 degrees or 135 degrees with respect to an axis used as a reference (horizontal axis), within a predetermined range, in a case this portion satisfies a predetermined condition. As a result, the line width of the determined portion can be made uniform with the line widths of portions above and under the portion for determination, in other words, the thin line object can be printed with the uniform line width.

However, in the above-described line width adjustment process, the line width is adjusted to be uniform by substantially reducing pixels to be filled in. Therefore, in a case where processing for uniforming the line width of thin lines is executed by the line width adjustment process, an area of pixels to be filled in is reduced, compared with a case where the line width adjustment process is not executed. As a result, in an image subjected to the line width adjustment process, there sometimes occurs, for example, a case where thin lines become too thin and are difficult to visually recognize.

SUMMARY OF THE INVENTION

The present invention provides an image forming apparatus that prevents, when reducing variation in thickness of thin lines, the legibility of the thin lines from being adversely affected thereby.

In a first aspect of the present invention, there is provided an image forming apparatus comprising at least one controller, having at least one processor which executes instructions stored in at least one memory and/or at least one circuitry, being configured to acquire print data, execute, in a rendering process for printing based on the print data, the rendering process including a line width adjustment process, and execute, in a case where the line width adjustment process is executed, not only the line width adjustment process but also a process for thickening thin lines.

In a second aspect of the present invention, there is provided a method of controlling an image forming apparatus capable of executing, in a rendering process for printing based on print data, the rendering process including a line width adjustment process, comprising acquiring print data, executing, in a rendering process for printing based on the print data, the rendering process including a line width adjustment process, and executing, in a case where the line width adjustment process is executed, not only the line width adjustment process but also a process for thickening thin lines.

In a third aspect of the present invention, there is provided a non-transitory computer-readable storage medium storing a computer-executable program for executing a method of controlling an image forming apparatus capable of executing, in a rendering process for printing based on print data, the rendering process including a line width adjustment process, wherein the method comprises acquiring print data, executing, in a rendering process for printing based on the print data, the rendering process including a line width adjustment process, and executing, in a case where the line width adjustment process is executed, not only the line width adjustment process but also a process for thickening thin lines.

According to the present invention, it is possible to prevent, when reducing variation in thickness of thin lines, the legibility of the thin lines from being adversely affected thereby.

Further features of the present invention will become apparent from the following description of exemplary embodiments (with reference to the attached drawings).

BRIEF DESCRIPTION OF THE DRAWINGS

FIGS. 2(A), 2(B), and 2(C) are a diagram useful in explaining image drawing, performed on print data of a plurality of thin lines, by a line width adjustment process (automatic stroke adjustment process).

FIG. 3 is a block diagram showing a hardware configuration of the image forming apparatus appearing in FIG. 1.

FIG. 4 is a diagram useful in explaining software modules realized in the image forming apparatus shown in FIG. 3.

FIG. 5 is a diagram useful in explaining a correspondence between designated values of a PDL command for the automatic stroke adjustment process, included in print data, values of a setting of the line width adjustment process (attribute of automatic stroke adjustment), and values of a setting of a thin line-thickening process (internal parameter of the thin line-thickening process).

FIG. 10 is a flowchart of a thin line adjustment-setting process based on the thin line adjustment-setting screen shown in FIG. 9B.

FIG. 11 is a diagram useful in explaining a correspondence between designated values of a PDL command for the automatic stroke adjustment process, include in print data, thin line adjustment modes set from a LUI (Local User Interface), values of a setting of the line width adjustment process (attribute of automatic stroke adjustment), and values of a setting of a thin line-thickening process (internal parameter of the thin line-thickening process).

DESCRIPTION OF THE EMBODIMENTS

The present invention will now be described in detail below with reference to the accompanying drawings showing embodiments thereof.

However, the component elements described in the following embodiments are described only by way of example and are by no means intended to limit the scope of the present invention to them alone.

Figure 1:
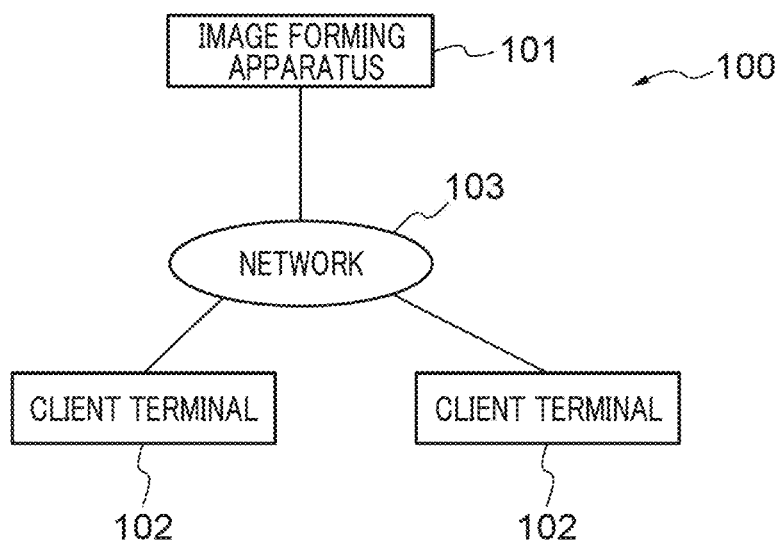
FIG. 1 is a schematic configuration diagram of an image forming system including an image forming apparatus according to a first embodiment of the present invention.

FIG. 1 is a schematic configuration diagram of an image forming system 100 including an image forming apparatus 101 according to a first embodiment of the present invention. The image forming system 100 shown in FIG. 1 includes the image forming apparatus 101, a plurality of client terminals 102, and a network 103 connecting these. Each client terminal 102 is e.g. a personal computer terminal (PC), a mobile phone terminal, a multi-function mobile phone terminal, a PDA terminal, or a tablet terminal, owned by a user. The network 103 is a wireless or wired data communication network formed by a WAN or LAN. The image forming apparatus 101 is e.g. a multi-function peripheral having various functions, such as scan, FAX, print (printing), and copy functions, or a printer having only a print function. Each client terminal 102 transmits print data to the image forming apparatus 101 via the network 103. The image forming apparatus 101 receives print data from the network 103, or generates print data by scanning an original. Upon receipt of print data, the image forming apparatus 101 executes a rendering process for plotting a drawing object, included in the print data, on device coordinates, according to print settings of double-sided print, an aggregated layout (Nup), an output sheet size, a resolution, and so forth. The image forming apparatus 101 prints an image generated by the rendering process on a sheet or the like.

Incidentally, examples of print data acquired by the image forming apparatus 101 for printing include print data in PostScript format, and print data in PDF format. The image forming apparatus 101 as data acquiring means can acquire print data in PostScript forma or print data in PDF format, as print data for which an automatic stroke adjustment process can be designated. In this case, the image forming apparatus 101 determines, when plotting printing coordinates of a drawing object on the device coordinates as the rendering process, pixels to be filled in, according to print instructions described in PDL which form the print data. Here, the meaning of PDL is Page-Description Language. The image forming apparatus 101 performs, when plotting a drawing object on the device coordinates based on the print data employing PostScript or PDF as PDL, fill-in pixel determination that if the drawing object touches any device pixel, even if only slightly, the pixel is filled in. With this, a line is expressed in a thicker size, and hence the legibility of an image printed on a sheet or the like can be improved. However, when a drawing object is plotted by this fill-in pixel determination, in a case where a thin line object having a width of one pixel is disposed such that it has an inclination with respect to the device coordinates, a plurality of pixels in a portion across a pixel boundary are to be filled in. The thin line having the width of one pixel comes to be drawn in a width of the plurality of pixels. As a result, the thin line object is drawn in a thicker and ununiform width, compared with a case where the line object is drawn horizontally or vertically along the array of the device coordinates. The thin line object has the ununiform line width depending on an angle of disposition thereof. As a countermeasure against this, some type of the image forming apparatus 101 is configured to execute, in a case where print data is set to be subjected to the automatic stroke adjustment process, the automatic stroke adjustment process in the rendering process. For example, PostScript and PDF each include a print setting referred to as the automatic stroke adjustment (StrokeAdjust), and more specifically, this processing can be specified by the following PDL commands: As a PS (PostScript) command, execution of the automatic stroke adjustment process can be designated by "true setstrokeadjust" validating the automatic stroke adjustment. Further, non-execution of the automatic stroke adjustment process can be designated by "false setstrokeadjust" invalidating the automatic stroke adjustment. As a PDF command, execution of the automatic stroke adjustment process can be designated by "/SA true" validating the automatic stroke adjustment. Further, non-execution of the automatic stroke adjustment process can be designated by "/SA false" invalidating the automatic stroke adjustment. When execution of the automatic stroke adjustment process is designated in print data, the image forming apparatus 101 executes processing for uniforming thin lines for pixels determined to be filled in by the rendering process based on the print data.

However, in a case where the automatic stroke adjustment process (line width adjustment process) is executed, the pixels to be filled in are substantially reduced to uniform the line width. Therefore, in a case where the processing for uniforming thin lines is executed by the line width adjustment process, an area of pixels filled in is reduced, compared with a case where the line width adjustment process is not executed. As a result, in an image formed by executing the line width adjustment process, there sometimes occurs, for example, a case where the thine lines are made too thin and difficult to visually recognize. Thus, when reducing variation in thickness of thin lines, the image forming apparatus 101 is required to prevent the legibility of the thin lines from being adversely affected thereby. Note that, hereafter, the automatic stroke adjustment process is referred to as the line width adjustment process as deemed appropriate.

FIGS. 2(A), 2(B), and 2(C) are a diagram useful in explaining image drawing, performed on prim data of a plurality of thin lines, by the line width adjustment process (automatic stroke adjustment process).

An image, shown in FIG. 2(A), is an example of an image which can be generated in a case where, with respect to a plurality of thin lines, the line width adjustment process for reducing variation in thickness of the thin lines is not executed. In a case where the function of automatically adjusting the width of thin lines (e.g. Stroke Adjust function) is made invalid or not set in image data, and an image is generated according to the filling rule of PostScript or PDF, the plurality of thin lines are generated into such an image as shown in FIG 2(A). Here, a horizontal thin line in FIG. 2(A) is a line having an inclination of 0 degrees with respect to the pixel array in the drawing image. Further, the thickness of thin lines having an inclination of 45 degrees is drawn thicker than the thin line having the inclination of 0 degrees. Thus, in a case where an image is drawn according to a predetermined type of PDL, in spite that the print data is for drawing thin lines having the same thickness, in the actually generated image, the plurality of thin lines become different in thickness depending on the inclination of each line.

An image shown in FIG. 2(B) is an example of an image which can be generated in a case where the line width adjustment process is executed by the automatic stroke adjustment (StrokeAdjust).

A plurality of thin lines in FIG. 2(B), generated in the case where the line width adjustment process is executed, are uniform in line width, compared with the case in FIG. 2(A), where the line width adjustment process is not executed. In the image shown in FIG. 2(B), the thickness of the thin line having the inclination of 0 degrees and the thickness of the thin line having the inclination of 45 degrees are made more uniform, compared with the case in FIG. 2(A). However, since the pixels to be filled in are reduced to uniform the line width, the thin lines made thin, whereby the whole image becomes thin. As a result, it is difficult for a user to visually recognize the thin lines.

An image shown in FIG. 2(C) is an example of an image which can be generated in a case where a thin line-thickening process for thickening thin lines is executed after the line width adjustment process.

Note that the image shown in FIG. 2(C) is an example of an image which can be generated by the processes described in the present embodiment. In the image shown in FIG. 2(C), the thin line thickening process is executed after the line width adjustment process. As a result, the plurality of thin lines become thicker than those in FIG. 2(B). The thickness of the thin lines is closer to that in the image shown in FIG. 2(A) generated based on the filling rule of PostScript or PDF. What is more, in the image shown in FIG. 2(C), similar to the case in FIG. 2(B), the plurality of thin lines are substantially uniform in line width, compared with the case in FIG. 2(A) where the line width adjustment process is not executed. The thickness of thin lines having an inclination of 0 degrees and the thickness of thin line having an inclination of 45 degrees are substantially uniform. Thus, in the image shown in FIG. 2(C), it is possible to generate an image of a plurality of thin lines each having a thickness which is good in legibility, while preventing the plurality of thin lines from becoming different in line width depending on a difference in inclination between thin lines.

FIG. 3 is a block diagram showing a hardware configuration of the image forming apparatus 101 appearing in FIG. 1. The image forming apparatus 101 shown in FIG. 3 includes a controller unit 200, a console section 208, and a printer engine 209. The controller unit 200 includes a central processing unit 201, a main storage device 202, an auxiliary storage device 203, a RIP 204, a network interface 205, a console section interface 206, a device interface 207, and a system bus 212 connecting these components. The network interface 205 is connected to the network 103. The network interface 205 transmits and receives print data and the like, to and from an external apparatus outside the image forming apparatus 101. The device interface 207 is connected to the printer engine 209 which is a device of the image forming apparatus 101. Further, not only the printer engine, but also a scan engine may be connected to the device interface 207, for example. The printer engine 209 prints an image of print data on a sheet or the like by an electrophotographic method or an inkjet method. The scan engine reads an image of an original and generates print data. The console section interface 206 is a user interface of the image forming apparatus 101, and includes a display device, such as a liquid crystal panel, and an input device, such as a touch panel and hard keys. The console section interface 206 may further include a speaker and a microphone for inputting and outputting sound. The RIP 204 is a processor that converts intermediate print data to a raster image. The RIP 204 processes intermediate print data generated by the central processing unit 201 in the main storage device 202 at high speed in parallel with execution of operation of the central processing unit 201. The main storage device 202 is e.g. a RAM. The main storage device 202 functions as a main memory and a work memory for the central processing unit 201. The auxiliary storage device 203 is e.g. a hard disk drive. The auxiliary storage device 203 stores programs and data. The central processing unit 201 loads a program stored in the auxiliary storage device 203 into the main storage device 202, and executes the loaded program. With this, a controller that controls the overall operation of the image forming apparatus 101 is realized in the central processing unit 201. The controller controls the operations of various devices connected to the system bus 212. The central processing unit 201 may hold data processed thereby, in the auxiliary storage device 203, temporarily or for a long time period.

FIG. 4 is a diagram useful in explaining software modules realized in the image forming apparatus 101 shown in FIG. 3. The software modules shown in FIG. 4 are realized in the image forming apparatus 101 as part of the functions of the controller. FIG. 4 shows, as the software modules realized in the image forming apparatus 101, a transmission and reception section 301, an interpreter 302, a renderer 304, a setting section 305, and a main controller 303. The main controller 303 manages the operations of the software modules realized in the image forming apparatus 101 and controls exchange of print data and so forth between these modules. The transmission and reception section 301 controls transmission and reception of data via the network interface 205. The transmission and reception section 301 acquires print data from the network interface 205 as data acquiring means, and outputs the acquired data to the main controller 303. The interpreter 302 acquires print data from the main controller 303. The interpreter 302 interprets drawing designation information, such as designation of the automatic stroke adjustment, as the print setting included in the acquired print data. The renderer 304 executes the rendering process (conversion process) for drawing print data using the RIP 204. Upon acquisition of print data from the main controller 303, the renderer 304 executes the rendering process for printing based on the print data, according to drawing designations interpreted by the interpreter 302. The renderer 304 executes processing based on the automatic stroke adjustment designation. With this, the renderer 304 generates a bitmap image for printing, from the print data. The RIP 204 outputs the generated bitmap image to the printer engine 209 via the device interface 207. The printer engine 209 prints the bitmap image on a sheet. The setting section 305 controls the console section 208. The setting section 305 displays a UI screen on the console section 208. The setting section 305 generates e.g. a setting of the automatic stroke adjustment process in the rendering process based on a user operation performed on the console section 208. The setting section 305 outputs the generated settings to the main controller 303. The main controller 303 controls the overall operation of the image forming apparatus 101 using the acquired settings. The main controller 303 may store the acquired settings e.g. in the main storage device 202 or the auxiliary storage device 203.

FIG. 5 is a diagram useful in explaining a correspondence between designated values of a PDL command for the automatic stroke adjustment process, included in print data, values of a setting of the line width adjustment process (attribute of automatic stroke adjustment), and values of a setting of a thin line-thickening process (internal parameter of the thin line-thickening process).

In the present embodiment, the renderer 304 executes the line width adjustment process for reducing variation in thickness of thin lines and the thin line-thickening process for thickening thin lines, based on a PDL command for the automatic stroke adjustment process, included in print data. The renderer 304 executes the thin line-thickening process after the line width adjustment process. With this, in the present embodiment, for example, such an image having the image quality as shown in FIG. 2(C), can be obtained.

As shown in FIG. 5, the print data is classified into print data without a PDL command for the automatic stroke adjustment process and print data with a PDL command for the automatic stroke adjustment process. Further, as the PDL command for the automatic stroke adjustment process, there is a setting of "true" validating the automatic stroke adjustment process, and a setting of "false" invalidating the automatic stroke adjustment process.

The interpreter 302 as interpretation means interprets print settings included in the print data.

For example, as indicated by "no designation" in the first row in FIG. 5, in a case where the print data does not include a PDL command for the automatic stroke adjustment process, the interpreter 302 does not interpret a PDL command for the automatic stroke adjustment process. In this case, the interpreter 302 does not instruct the renderer 304 to perform the line width adjustment process or the thin line-thickening process.

As indicated by "false" in the third row in FIG. 5, in a case where the print data includes a PDL command invalidating the automatic stroke adjustment process, the interpreter 302 interprets the PDL command for the automatic stroke adjustment process. However, the interpreter 302 does not instruct the renderer 304 to perform the line width adjustment process or the thin line-thickening process.

As indicated by "true" in the second row in FIG. 5, in a case where the print data includes a PDL command validating the automatic stroke adjustment process, the interpreter 302 interprets the PDL command for the automatic stroke adjustment process. Then, the interpreter 302 instructs the renderer 304 to perform both of the line width adjustment process and the thin line-thickening process.

Thus, the renderer 304 as execution means executes, when executing the rendering process on print data, not only the line width adjustment process but also the thin line-thickening process.

Figure 6:
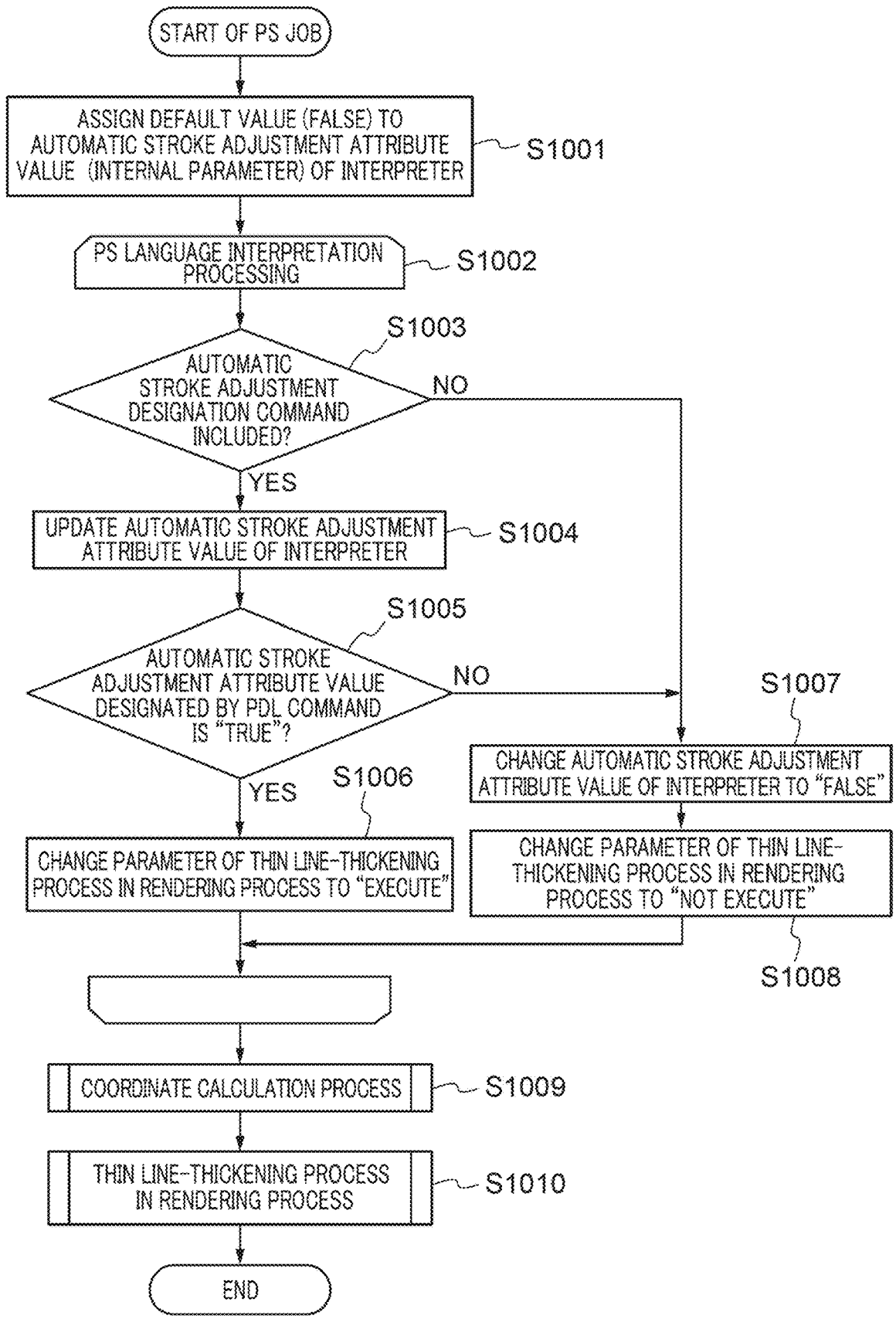
FIG. 6 is a flowchart of a job execution process for print data, which is performed by a central processing unit appearing in FIG. 3.

FIG. 6 is a flowchart of a job execution process for print data, performed by the central processing unit 201 appearing in FIG. 3.

When the transmission and reception section 301 as the data acquiring means of the image forming apparatus 101, or the like, receives print data as a job, the central processing unit 201 performs the process in FIG. 6. Note that in the illustrated example, it is assumed that the job is a PostScript (PS) job.

In the process in FIG. 6, the central processing unit 201 determines whether or not to execute both of the line width adjustment process and the thin line-thickening process, as the automatic stroke adjustment process, based on whether or not a command for designating the automatic stroke adjustment process is included in the acquired print data, and a value of the command if the command is included.

In a step S1001, the central processing unit 201 assigns a default value to a setting of the automatic stroke adjustment process (automatic stroke adjustment attribute value (internal parameter value)) of the interpreter 302.

The central processing unit 201 assigns an invalidating value of "false" to the setting of the automatic stroke adjustment process as an initial value. Note that the central processing unit 201 may assign a validating value of "true" to the setting of the automatic stroke adjustment process as the initial value.

In a step S1002, the central processing unit 201 starts processing for interpreting the language of the received print data.

The central processing unit 201 repeatedly executes steps S1003 to S1008 while performing the language interpretation processing until language interpretation is completed for all commands included in the print data.

In a step S1003, the central processing unit 201 determines whether or not a PDL command designating a setting of the automatic stroke adjustment process of the interpreter 302 is included in the received print data. If a PDL command designating a setting of the automatic stroke adjustment process is not included, the central processing unit 201 proceeds to a step S1007. If a PDL command designating a setting of the automatic stroke adjustment process is included, the central processing unit 201 proceeds to a step S1004.

In the step S1004, the central processing unit 201 notifies the interpreter 302 of a designated value of the PDL command for the automatic stroke adjustment process, detected in the step S1003, and updates the associated setting of the interpreter 302.

Here, whether the designated value of the PDL command is the validating value of "true" or the invalidating value of "false" is not particularly discriminated, but the central processing unit 201 notifies the interpreter 302 of the designated value, as it is.

In the step S1005, the central processing unit 201 determines whether or not the setting of the automatic stroke adjustment process for the interpreter 302, which is updated in the step S1004, has the validating value of "true".

If the setting of the automatic stroke adjustment process has the invalidating value of "false", the central processing unit 201 proceeds to the step S1007.

If the setting of the automatic stroke adjustment process has the validating value of "true", the central processing unit 201 proceeds to the step S1006.

In the step S1006, the central processing unit 201 changes a setting of the thin line-thickening process for instructing whether or not to execute the thin line-thickening process in the rendering process, from the initial value to a value of "execute".

In the step S1007, the central processing unit 201 sets the setting of the automatic stroke adjustment process for the interpreter 302 to the invalidating value of "false".

In the step S1008, the central processing unit 201 changes the setting of the thin line-thickening process for instructing whether or not to execute the thin line-thickening process in the rendering process, from the initial value to a value of "not execute".

With this, ones of the settings as defined in FIG. 5 are set for the interpreter 302 and the renderer 304, respectively.

When language interpretation is completed for all commands included in the print data, the central processing unit 201 terminates the language interpretation processing on the received print data.

In a step S1009, the central processing unit 201 performs a coordinate calculation process.

In a step S1010, the central processing unit 201 performs the thin line-thickening process in the rendering process.

The central processing unit 201 thus executes the job processing according to the above-described process.

Figure 7:
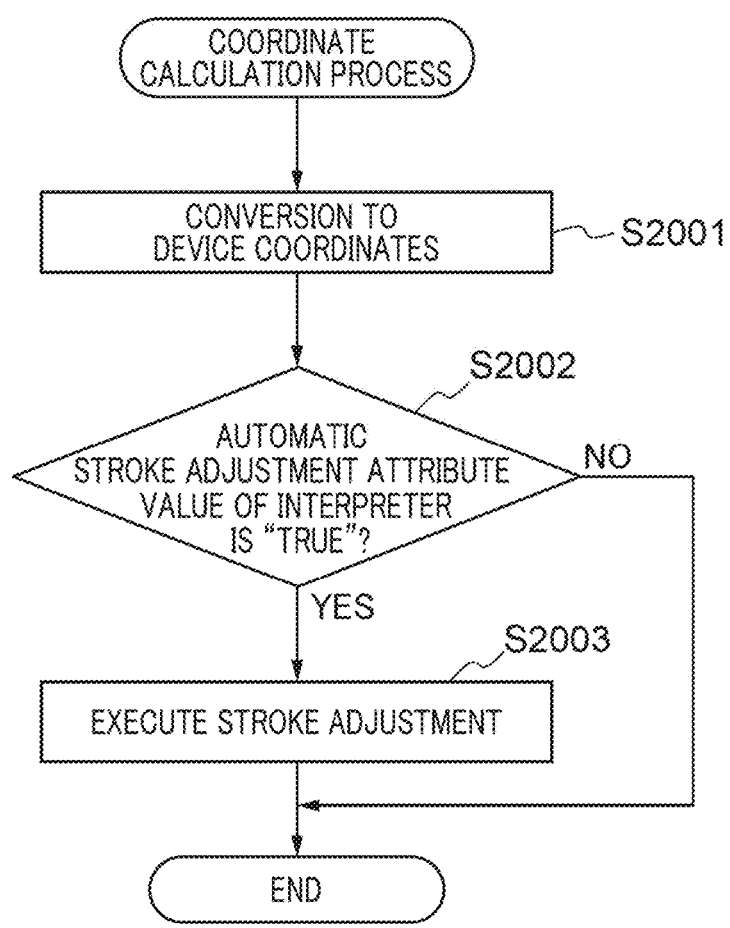
FIG. 7 is a flowchart of a coordinate calculation process in a step in FIG. 6.

FIG. 7 is a flowchart of the coordinate calculation process in the step S1009 in FIG. 6.

The central processing unit 201 of the image forming apparatus 101 executes, as the interpreter 302, the language interpretation processing as described with reference to FIG. 6, checks whether or not a command designating the automatic stroke adjustment designation is included in the print data, and updates the setting of the automatic stroke adjustment process.

After that, the interpreter 302 changes the setting of the thin line-thickening process according to whether or not the setting of the automatic stroke adjustment process has the validating value of "true".

Then, in the step S1009 in FIG. 6, the interpreter 302 plots the printing position of the drawing object, included in the print data, on the device coordinates using the setting of the automatic stroke adjustment process, by the coordinate calculation process details of which will be described with reference to FIG. 7.

When the language interpretation processing in the step S1002 et seq. in FIG. 6 is completed, in the step S1009, the interpreter 302 executes the coordinate calculation process in FIG. 7.

In a step S2001, the central processing unit 201 determines printing coordinates of a drawing object, included in the print data, on the device coordinates, by calculation.

In a step S2002, the central processing unit 201 determines whether or not the setting of the automatic stroke adjustment process for the interpreter 302 has the validating value of "true".

If the setting of the automatic stroke adjustment process does not have the validating value of "true", the central processing unit 201 terminates the process in FIG. 7.

If the setting of the automatic stroke adjustment process has the validating value of "true", the central processing unit 201 proceeds to a step S2003.

In the step S2003, the central processing unit 201 applies stoke adjustment to the printing coordinates of the drawing object calculated in the step S2001.

The central processing unit 201 executes the stroke adjustment process according e.g. to instructions described for the automatic stroke adjustment in the PostScript reference manual or the PDF reference manual.

The central processing unit 201 of the image forming apparatus 101 thus executes the coordinate calculation process in FIG. 7.

Figure 8:
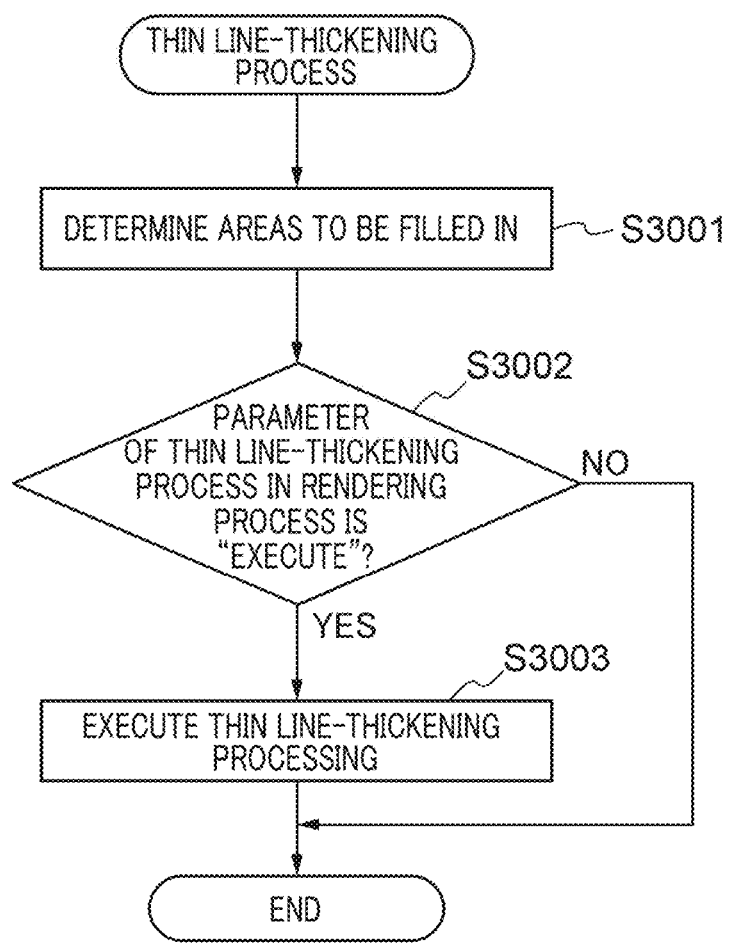
FIG. 8 is a flowchart of a thin line-thickening process in a step in FIG. 6.

FIG. 8 is a flowchart of the thin line-thickening process in the step S1010 in FIG. 6.

The central processing unit 201 of the image forming apparatus 101 executes the rendering process in the step S1010 in FIG. 6, as the renderer 304, as described in detail hereafter with reference to FIG. 8.

In a step S3001, the central processing unit 201 determines an area to be filled in according to a setting of the fill-in rule, set by the interpreter 302, for a drawing object included in the print data.

The central processing unit 201 performs the line width adjustment process in the rendering process, for printing based on the print data.

If there is no setting of the fill-in rule for the automatic stroke adjustment process, the central processing unit 201 determines areas to be filled-in with respect to a plurality of thin lines, as exemplified in FIG. 2(A).

If there is the setting of the fill-in rule for the automatic stroke adjustment process, the central processing unit 201 determines areas to be filled-in with respect to the plurality of thin lines, as exemplified in FIG. 2(B).

In a step S3002, the central processing unit 201 determines whether or not the setting of the thin line-thickening process for the rendering process has the value of "execute".

If the setting of the thin line-thickening process does not have the value of "execute", the central processing unit 201 terminates the process in FIG. 8.

If the setting of the thin line-thickening process has the value of "execute", the central processing unit 201 proceeds to a step S3003.

In the step S3003, the central processing unit 201 executes the thin line-thickening processing with respect to the areas to be filled in, determined in the step S3001.

In the thin line-thickening processing, the central processing unit 201 adds areas to be filled in so as to increase the line width with respect to the areas to be filled in determined in the step S3001.

The central processing unit 201 executes the thin line-thickening processing on the areas to be filled in as exemplified in FIG. 2(B), to thereby determine areas to be filled in for the plurality of thin lines, as expressed in FIG. 2(C).

The thin line-thickening process for the image forming apparatus 101 is thus performed.

As described above, in the present embodiment, in a case where the line width adjustment process is executed for acquired print data, the central processing unit 201as the execution means executes the thin line thickening process after executing the line width adjustment process. For example, in a case where from interpretation of the print settings included in the print data, the setting of the line width adjustment process is determined to have the validating value, the central processing unit 201 executes not only the line width adjustment process but also the thin line-thickening process. In a case where an interpretation result other than this is obtained, the central processing unit 201 executes neither the line width adjustment process nor the thin line thickening process. With this, in the present embodiment, in a case where thin lines are thinned by reducing variation in thickness of the thin lines, it is possible to thicken the thin lines. The thin lines included in the print data are printed as lines which have a thickness easy to visually recognize and are uniform and not too thin. As a result, in the present embodiment, it is possible to prevent the thin lines from being made too thin and difficult to visually recognize due to the setting for reducing variation in thickness of thin lines, and adjust the thin lines to have a proper thinness which is uood for legibility.

With this, even if the image forming apparatus 101 does not have sufficient reproduction capability e.g. in printing thin lines, an image including thin lines difficult to recognize is hardly generated. Further, even if the image forming apparatus 101 is set to suppress the amount of toner consumption in the printing process, an image including thin lines difficult to recognize is hardly generated.

In the present embodiment, in a case where the setting of the automatic stroke adjustment process command (thin line width automatically adjusting function) has the validating value of "true", not only the line width adjustment process but also the line width thickening process is executed, whereby it is possible to suppress deterioration of an image.

Next, a description will be given of an image forming apparatus 101 according to a second embodiment of the present invention. The following description is given mainly of different points from the above-described first embodiment. In the first embodiment, the thin line-thickening process is necessarily executed in a case where the line width adjustment process is executed, whereby the thin lines are necessarily improved in the legibility. On the other hand, in the present embodiment, even in a case where the line width adjustment process is executed, execution of the thin line-thickening process is separately determined according to a type of print data, etc. With this, the thin lines can be processed, according to the type of print data, etc., to a state suited to the type.

Figure 9A:
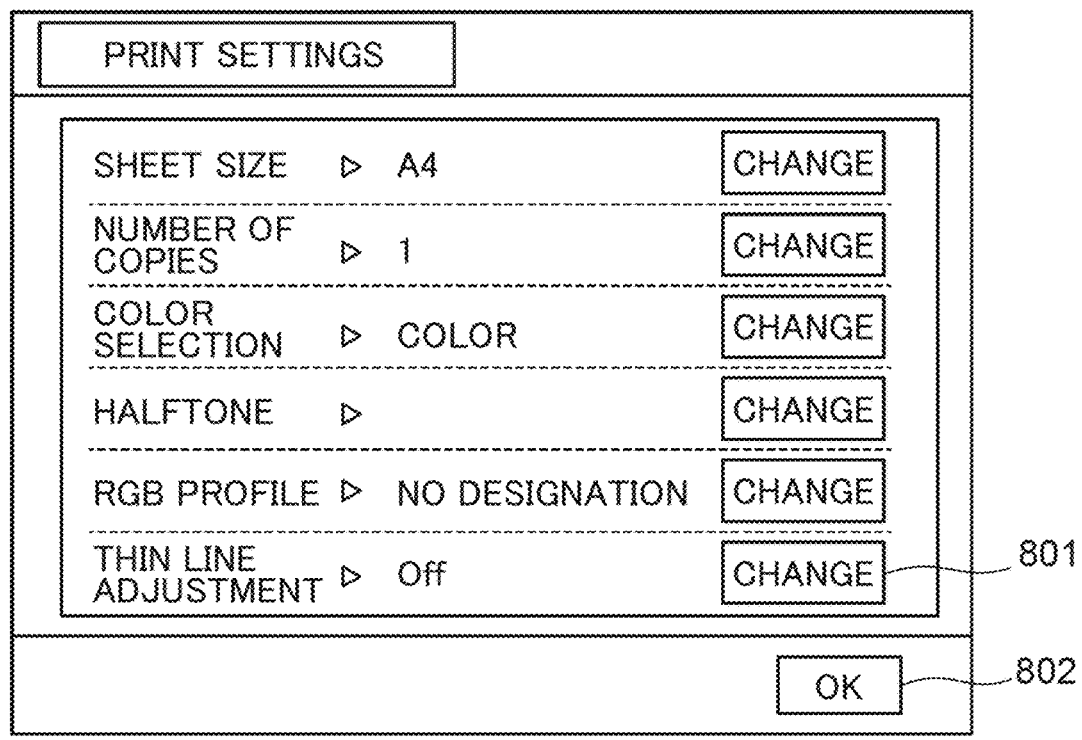
FIGS. 9A and 9B are diagrams each showing an example of a print settings screen and a thin line adjustment-setting screen displayed on a console section of an image forming apparatus according to a second embodiment of the present invention.
Figure 9B:
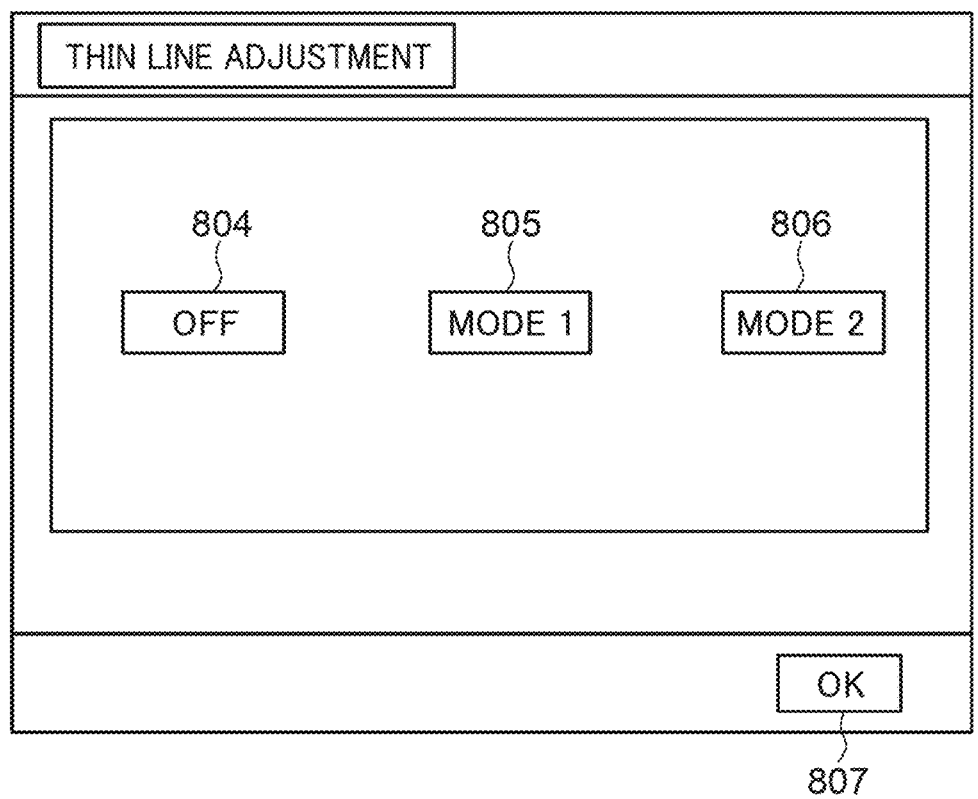

FIGS. 9A and 9B shows examples of a print setting screen and a thin line adjustment-setting screen displayed on the console section 208 of the image forming apparatus 101 according to the second embodiment, respectively.

FIG. 9A shows the print setting screen displayed on the console section 208 appearing in FIG. 3.

FIG. 9B shows the thin line adjustment-setting screendisplayed on the console section 208 appearing in FIG. 3.

The central processing unit 201 of the image forming apparatus 101 displays the setting screens, shown in FIGS. 9A and 9B, on the console section 208 when executing various jobs including a print job or when setting default settings for the image forming apparatus 101.

The print setting screen, shown in FIG. 9A, displays change buttons 801 for changing various setting items in the image forming process, such as a sheet size, the number of copies, color selection, halftone, RGB profile, and thin line adjustment.

After selecting an input for a setting of the thin line adjustment, when an "OK" button 802 on this screen is operated by a user operation, the console section 208 outputs the selected input to the central processing unit 201. In response to this, the central processing unit 201 terminates the setting processing based on the print setting screen shown in FIG. 9A and displays another setting screen or a job setting screen on the console section 208.

When the change button 801 associated with the thin line adjustment is selected by a user operation, the console section 208 outputs the selected input to the central processing unit 201. In response to this, the central processing unit 201 displays the thin line adjustment-setting screen shown in FIG. 9B on the console section 208.

The 1 thin line adjustment-setting screen shown in FIG. 9B displays a "not set" button 804, a "mode 1" button 805, and a "mode 2" button 806, as thin line adjustment modes for the thin line processing of the image forming apparatus 101.

The "mode 1" is a thin line adjustment mode for executing the line width adjustment process but not executing the thin line-thickening process. For example, in a case where print data uses a lot of thin line objects, such as CAD graphics, an image having thin lines thickened and made illegible is not desired, but fine drawing of the thin line objects is required.

The "mode 2" is a thin line adjustment mode for executing both of the line width adjustment process and the thin line-thickening process. For example, in a case where print data is data using a lot of graph objects, such as an office document, drawing of thin lines, which are made uniform and thick, is required. With this, the graph objects become beautiful and legible.

The setting "not set" is a thin line adjustment mode for not executing the line width adjustment process. The line width adjustment function is disabled. In this case, the thin line-thickening process to be executed together with the line width adjustment process is also disabled.

When the "mode 1" button 805 or the "mode 2" button 806 is thus selected, the automatic stroke adjustment function is enabled.

The central processing unit 201 of the image forming apparatus 101 records a default value or a set value of selection of these modes in the main storage device 202 or the auxiliary storage device 203, and uses the recorded value for processing print data thereafter.

The central processing unit 201 as setting acquiring means acquires the setting of the line width adjustment process and the like, set separately from the print data.

FIG. 10 is a flowchart of a thin line adjustment-setting process based on the thin line adjustment-setting screen shown in FIG. 9B.

When the change button 801 for the thin line adjustment is selected by a user operation, the console section 208 outputs the selected input to the central processing unit 201. Upon receipt of this, the central processing unit 201 starts the process in FIG. 10.

In a step S4001, the central processing unit 201 displays the thin line adjustment-setting screen shown in FIG. 9B on the console section 208.

In a step S4002, the central processing unit 201 determines whether or not the line width adjustment setting has been changed by a user operation.

If any of the "not set" button 804, the "mode 1" button 805, or the "mode 2" button 806 has been selected for input, the central processing unit 201 determines that the line width adjustment setting has been changed. In this case, the central processing unit 201 proceeds to a step S4003.

If the operation of an "OK" button 807 has been input before any of the buttons 804 to 806 is operated, the central processing unit 201 determines that the line width adjustment setting has not been changed. In this case, the central processing unit 201 terminates the present process in FIG. 10.

In the step S4003, the central processing unit 201 updates the setting of the line width adjustment in a settings database, stored in the main storage device 202 or the auxiliary storage device 203, with the set value corresponding to the input by the user operation in the S4002. Then, the central processing unit 201 terminates the present process in FIG. 10.

Thus, the central processing unit 201 of the image forming apparatus 101 executes the thin adjustment setting process based on the setting screen shown in FIG. 9B.

FIG. 11 is a diagram useful in explaining a correspondence between designated values of the PDL command for the automatic stroke adjustment process, include in print data, thin line adjustment modes set from a LUI (Local User Interface), values of the setting of the line width adjustment process (attribute of automatic stroke adjustment), and values of the setting of the thin line-thickening process (internal parameter of the thin line-thickening process).

A table 1101 shown in FIG. 11 is stored in the main storage device 202 or the auxiliary storage device 203, as part of the settings database.

The first column in FIG. 11 indicates designated values of the PDL command for the automatic stroke adjustment process, included in the print data. The PDL command for the automatic stroke adjustment process has values of "no designation", "true" validating the automatic stroke adjustment, and "false" invalidating the automatic stroke adjustment. The setting of "no designation" means that no designation of the PDL command for the automatic stroke adjustment process is included in the print data.

The second column in FIG. 11 indicates a default value or a set value of the thin line adjustment, which is set in the settings database via an LUI (local user interface) of the image forming apparatus 101. The default value or the set value of the thin line adjustment has values of "OFF" (not set), "mode 1", and "mode 2".

Further, the table 1101 shown in FIG. 11 has a setting of the line width adjustment process in the third column and a setting of the thin line-thickening process in the fourth column, with respect to each of nine combinations of the value of the first column and the value of the second column.

Figure 12:
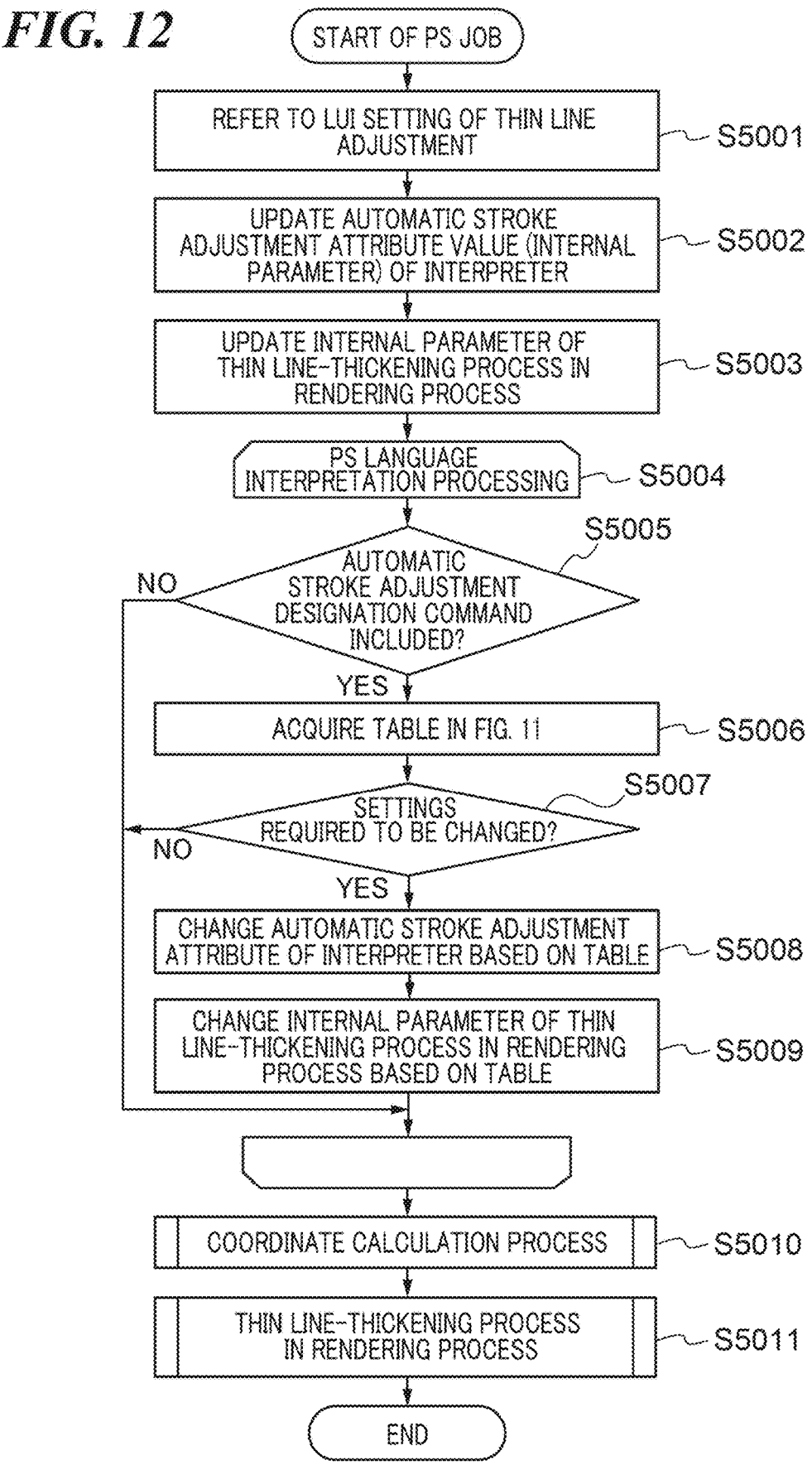
FIG. 12 is a flowchart of a job execution process for print data, which is performed by the central processing unit in the second embodiment.

FIG. 12 is a flowchart of a job execution process for print data, performed by the central processing unit 201 in the second embodiment.

When the transmission and reception section 301 as the data acquiring means of the image forming apparatus 101 acquires print data as a job, the central processing unit 201 performs the process in FIG. 12.

In a step S5001, the central processing unit 201 accesses a portion, set via the UI screen shown in FIG. 9B, of the settings database, and acquires a value of the setting of the line width adjustment, set for the image forming apparatus 101 using the UI screen.

In a step S5002, the central processing unit 201 notifies the interpreter 302 of the setting for line width adjustment, acquired in the step S5001, and updates the setting of the interpreter 302.

More specifically, the central processing unit 201 internally generates a corresponding PDL command based on the setting of the line width adjustment acquired in the step S5001, and outputs the generated PDL command to the interpreter 302. With this, the central processing unit 201 updates the setting of the automatic stroke adjustment process set for the interpreter 302.

For example, in a case where the setting of line width adjustment has the validating value of "true" in the settings database, the central processing unit 201 internally generates a PDL command of "true setstrokeadjust" for a PS (PostScript) job and outputs the generated PDL command to the interpreter 302. Alternatively, the central processing unit 201 internally generates a PDL command of "/SA true" for a PDF job and outputs the generated PDL command to the interpreter 302.

In a case where the setting of the line width adjustment has the invalidating value of "false" in the settings database, the central processing unit 201 internally generates a PDL command of "false setstrokeadjust" for a PS job, and outputs the generated PDL command to the interpreter 302. Alternatively, the central processing unit 201 internally generates a PDL command of "/SA false" for a PDF job, and outputs the generated PDL command to the interpreter 302.

In a step S5003, the central processing unit 201 updates the setting of the thin line-thickening process to be sent to the renderer 304, based on the setting of the line width adjustment acquired in the step S5001.

In a step S5004, the central processing unit 201 starts the language interpretation processing for the received print data.

The central processing unit 201 repeatedly executes steps S5005 to S5009 while performing the language interpretation processing until language interpretation is completed for all commands included in the print data.

In the step S5005, the central processing unit 201 determines whether or not a PDL command instructing a change of the setting of the automatic stroke adjustment process to the interpreter 302 is included in the received print data.

If a PDL command instructing a change of the setting of the automatic stroke adjustment process is not included, the central processing unit 201 proceeds to the determination with respect to the next PDL command included in the print data. However, in a case where the determination is completed for all PDL commands included in the print data, the central processing unit 201 proceeds to a step S5010.

If a PDL command instructing a change of the setting of the automatic stroke adjustment process is included, the central processing unit 201 proceeds to a step S5006.

In the step S5006, the central processing unit 201 acquires the table 1101 shown in FIG. 11.

In the step S5007, the central processing unit 201 determines whether or not it is required to change any of the respective settings of the automatic stroke adjustment process and the thin line-thickening process, as the automatic stroke adjustment process.

For example, the central processing unit 201 acquires the PDL command included in the print data and the setting set for the image forming apparatus 101, as the setting of the line width adjustment process, set separately from the print data, and interprets these. As shown in FIG. 11, the PDL command included in the print data has the values of "no designation", "true" validating the automatic stroke adjustment, or "false" invalidating the automatic stroke adjustment. The setting of the image forming apparatus 101 has the values of "OFF" (not set), "mode 1" giving higher priority to the automatic stroke adjustment than legibility", and "mode 2" giving higher priority to legibility than the automatic stroke adjustment". Based on both of the interpreted values, the central processing unit 201 compares values of the settings to be selected for the line width adjustment process and the thin line-thickening process from the table shown in FIG. 11 and the respective corresponding current values, and if they are different, it is determined that the change of the settings is required, whereas if the corresponding values coincide with each other, it is determined that the change of the settings is not required.

If the change of the settings is not required, the central processing unit 201 proceeds to the determination with respect to the next PDL command included in the print data. However, when the determination is completed with respect to all PDL commands included in the print data, the central processing unit 201 proceeds to the step S5010.

If the change of the settings is required, the central processing unit 201 proceeds to the step S5008.

In the step S5008, the central processing unit 201 changes the setting of the automatic stroke adjustment process, set for the interpreter 302, based on the table 1101, shown in FIG. 11.

In the step S5009, the central processing unit 201 changes the setting of the thin line-thickening process for instructing whether or not to execute the thin line-thickening process in the rendering process, based on the table 1101, shown in FIG. 11.

For example, in a case where the setting of the PDL command included in the print data has the value of "no designation" and the setting of the image forming apparatus 101 has the value of "OFF", the central processing unit 201 sets the setting of the line width adjustment process (attribute of the automatic stroke adjustment) to the invalidating value of "false" based on the table 1101 shown in FIG. 11. Further, the central processing unit 201 sets the setting of the thin line-thickening process to the value of "not execute".

In a case where the setting of the PDL command included in the print data has the value of "no designation" and the setting of the image forming apparatus 101 has the value of "mode 1", the central processing unit 201 sets the setting of the line width adjustment process to the validating value of "true" and the setting of the thin line-thickening process to the value of "not execute". In this case, the renderer 304 as the execution means executes the line width adjustment process. Although, in general, the renderer 304 does not execute the line width adjustment process in a case where the setting of the PDL command included in the print data does not have the validating value of "true" , the renderer 304 executes the line width adjustment process based on the setting of "mode 1" set for the image forming apparatus 101.

In a case where the setting of the PDL command included in the print data has the value of "no designation" and the setting of the image forming apparatus 101 has the value of "mode 2", the central processing unit 201 sets the setting of the line width adjustment process to the validating value of "true" and the setting of the thin line-thickening process to the value of "execute". In this case, the renderer 304 as the execution means executes not only the line width adjustment process but also the thin line-thickening process. Although, in general, the renderer 304 does not execute the line width adjustment process in a case where the setting of the PDL command included in the print data does not have the validating value of "true", in the present embodiment, the renderer 304 executes the line width adjustment process and the thin line-thickening process based on the setting of "mode 2" set for the image forming apparatus 101.

In a case where the setting of the PDL command included in the print data has the validating value of "true" and the setting of the image forming apparatus 101 has the value of "OFF", the central processing unit 201 sets the setting of the line width adjustment process to the validating value of "true" and the setting of the thin line-thickening process to the value of "execute". In this case, even when the setting of the image forming apparatus 101does not have the validating value, the renderer 304 as the execution means executes the line width adjustment process, based on the value validating the line width adjustment process, obtained by interpreting the PDL command. More specifically, the renderer 304 executes the line width adjustment process and the thin line-thickening process.

In a case where the setting of the PDL command included in the print data has the validating value of "true" and the setting of the image forming apparatus 101 has the value of "mode 1", the central processing unit 201 sets the setting of the line width adjustment process to the validating value of "true" and the setting of the thin line-thickening process to the value of "not execute". In this case, the renderer 304 as the execution means executes only the line width adjustment process and does not execute the thin line-thickening process. Although, in general, the renderer 304 executes the line width adjustment process and the thin line-thickening process when the setting of the PDL command included in the print data has the validating value of "true", in the present embodiment, the renderer 304 does not execute the thin line-thickening process exceptionally, when the thin line adjustment mode is "mode 1".

In a case where the setting of the PDL command included in the print data has the validating value of "true" and the setting of the image forming apparatus 101 has the value of "mode 2", the central processing unit 201 sets the setting of the line width adjustment process to the validating value of "true" and the setting of the thin line-thickening process to the value of "execute".

In a case where the setting of the PDL command included in the print data has the invalidating value of "false" and the setting of the image forming apparatus 101 has the value of "OFF", the central processing unit 201 sets the setting of the line width adjustment process to the invalidating value of "false" and the setting of the thin line-thickening process to the value of "not execute".

In a case where the setting of the PDL command included in the print data has the invalidating value of "false" and the setting of the image forming apparatus 101 has the value of "mode 1", the central processing unit 201 sets the setting of the line width adjustment process to the invalidating value of "false" and the setting of the thin line-thickening process to the value of "not execute". In the case where the setting of the PDL command does not have the validating value as described above, even when the setting of the image forming apparatus 101 has the validating value, the renderer 304 as the execution means executes neither the line width adjustment process nor the thin line-thickening process.

In a case where the setting of the PDL command included in the print data has the invalidating value of "false" and the setting of the image forming apparatus 101 has the value of "mode 2", the central processing unit 201 sets the setting of the line width adjustment process to the invalidating value of "false" and the setting of the thin line-thickening process to the value of "not execute". In the case where the setting of the PDL command does not have the validating value as described above, even when the setting of the image forming apparatus 101 has the validating value, the renderer 304 as the execution means executes neither the line width adjustment process nor the thin line-thickening process.

When the above-described processing for interpreting the PDL command for the automatic stroke adjustment process is terminated, the central processing unit 201 proceeds to the determination with respect to the next PDL command included in the print data. However, when the determination is completed for all PDL commands included in the print data, the central processing unit 201 proceeds to the step S5010.

In the step S5010, the central processing unit 201 performs the coordinate calculation process. The central processing unit 201 performs the same coordinate calculation process as described with reference to FIG. 7 in the first embodiment, according to the setting of the line width adjustment process.

In a step S5011, the central processing unit 201 performs the thin line-thickening process in the rendering process.

The central processing unit 201 performs the same thin line-thickening process as described with reference to FIG. 8 in the first embodiment in the rendering process, according to the setting of the thin line-thickening process.

Thus the central processing unit 201 executes and terminates the job execution process for the image forming apparatus 101.

As described above, in the present embodiment, in a case where the acquired setting of the line width adjustment process, set separately from print data, has the validating value, the line width adjustment process and the thin line-thickening process are executed.

On the other hand, in the present embodiment, in a case where the acquired setting of the line width adjustment process, set separately from print data, does not have the validating value, neither the line width adjustment process nor the thin line-thickening process is executed.

With this, in the present embodiment, it is possible to execute the line width adjustment process and the thin line-thickening process, regardless of the setting of the line width adjustment process included in the print data.

Even in a case where the print data includes the setting of the line width adjustment process having the invalidating value or includes no setting associated with this process, in the present embodiment, it is possible to execute the line width adjustment process and the thin line-thickening process.

In the present embodiment, even in a case where the setting of the line width adjustment process does not have the validating value, the renderer 304 as the execution means executes the line width adjustment process based on the setting of the line width adjustment process having the validating value, included in the print data. More specifically, the renderer 304 performs the line width adjustment process and the thin line-thickening process.

Further, in a case where the setting of the line width adjustment process, included in the print data, does not have the validating value, even when the setting of the image forming apparatus 101 for the line width adjustment process has the validating value, the renderer 304 executes neither the line width adjustment process nor the thin line-thickening process.

With this, the renderer 304 can give higher priority to the setting of the line width adjustment process, included in the print data, than to the setting of the line width adjustment process for the image forming apparatus 101.

Particularly, in the present embodiment, the central processing unit 201 as the interpretation means interprets the setting of the line width adjustment process, with respect to the print data, as "valid", "invalid", or "no designation". Further, the central processing unit 201 acquires the setting of the line width adjustment process, set separately from the print data, as "invalid (OFF)", "the first mode setting (mode 1) for giving higher priority to the automatic stroke adjustment than legibility", or "the second mode setting (mode 2) for giving higher priority to legibility than the automatic stroke adjustment.

Then, in a case where the setting of the line width adjustment process acquired from the image forming apparatus 101 is the first mode setting (mode 1), the renderer 304 as the execution means executes only the line width adjustment process, based on the validating value of the setting of the line width adjustment process, included in the print data. In this case, the thin line-thickening process is not executed. With this, for example, when drawing print data using a lot of thin line objects, such as CAD graphics and requiring a fine drawing result, it is possible to execute drawing processing in which the drawing objects are accurately reproduced by applying automatic stroke adjustment thereto.

Further, in a case where the setting of the line width adjustment process acquired from the image forming apparatus 101 is the second mode setting (mode 2), even when the setting of the line width adjustment process, included in the print data, has the value of "no designation", the renderer 304 executes not only the line width adjustment process but also the thin line-thickening process. With this, when drawing print data using a lot of graph objects e.g. in an office document, it is possible to execute drawing processing for generating a drawing result having thin lines which are uniform but are made thick, for higher legibility.

The renderer 304 as the execution means can execute, according to an image, proper drawing processing suitable for the image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-043872 filed Mar. 11, 2019, which is hereby incorporated by reference herein in its entirety.

What is claimed is:

1. An image forming apparatus including an interpreter, the image forming apparatus comprising:
   at least one controller including a processor and a memory, the controller configured to;
   provide to the interpreter, print data including lines and a predetermined command for executing a predetermined process, which if the print data includes lines having same widths and different angles, unifies widths of lines to be formed;

determine that the print data includes the predetermined command;
receive from the interpreter that has executed the predetermined process, the lines on which the predetermined process has been executed so that the widths of the lines to be formed are unified;
based on the determination that the print data includes the predetermined command, thicken the lines received from the interpreter; and
form the thickened lines.

2. The image forming apparatus according to claim 1, wherein the print data further includes a setting regarding the predetermined command, and
wherein the at least one controller is configured to:
determine that the setting included in the print data is a setting for validating the predetermined command, and
based on the determination that the setting included in the print data is a setting for validating the predetermined command, thicken the lines received from the interpreter, and form the thickened lines.

3. The image forming apparatus according to claim 2, wherein the at least one controller is configured to:
receive a second setting regarding the predetermined command, which is different from the setting included in the print data, and
even when not receiving, as the second setting, a setting for validating the predetermined command, in a case where the setting included in the print data is a setting for validating the predetermined command, thicken the lines received from the interpreter, and form the thickened lines.

4. The image forming apparatus according to claim 3, wherein
the setting included in the print data includes validating, invalidating, or no designation, regarding the predetermined command, and
the second setting includes invalidating, a first mode setting for giving higher priority to automatic stroke adjustment than to legibility, or a second mode setting for giving higher priority to legibility than to automatic stroke adjustment, and
wherein the at least one controller is configured to:
in a case where the first mode setting is set as the second setting, not thicken the lines received from the interpreter, and
in a case where the second mode setting is set as the second setting, even when the setting included in the print data is no designation, thicken the lines received from the interpreter and form the thickened lines.

5. The image forming apparatus according to claim 1, wherein the at least one controller is configured to:
receive a second setting regarding the predetermined command, which is different from a setting included in the print data, and
when receiving, as the second setting, a setting for validating the predetermined command, thicken the lines received from the interpreter, and form the thickened lines.

6. A method of controlling an image forming apparatus including an interpreter, capable of executing, in a rendering process for printing based on print data, the rendering process including a line width adjustment process, comprising:
providing, to the interpreter, the print data including lines and a predetermined command for executing a predetermined process, which if the print data includes lines having same widths and different angles, unifies widths of lines to be formed;
determining that the print data includes the predetermined command;
receiving from the interpreter that has executed the predetermined process, the lines on which the predetermined process has been executed so that the widths of the lines to be formed are unified;
based on the determination that the print data includes the predetermined command, thickening the lines received from the interpreter; and
forming the thickened lines.

7. An image forming apparatus including an interpreter, the image forming apparatus comprising;
at least one controller including a processor and a memory, the controller configured to;
provide to the interpreter, print data including lines;
determine whether the print data includes a predetermined command for executing a predetermined process, which if the print data includes lines having same widths and different angles, unifies widths of lines to be formed;
receive from the interpreter, the lines on which the predetermined process has been executed so that the widths of the lines are unified if the print data includes the predetermined command, and lines on which the predetermined process has not been executed if the print data does not include the predetermined command;
based on a determination that the print data includes the predetermined command, thicken the lines received from the interpreter and from the thickened lines;
based on a determination that the print data does not include the predetermined command, form the lines received from the interpreter without thickening the lines.

* * * * *